United States Patent [19]

Barber et al.

[11] 4,204,639

[45] May 27, 1980

[54] CODED LABEL

[75] Inventors: Donald T. Barber; Thomas C. Scrymgeour, both of Willowdale, Canada

[73] Assignee: Datafile Limited, Willowdale, Canada

[21] Appl. No.: 775,687

[22] Filed: Mar. 9, 1977

[51] Int. Cl.² .................. G06K 7/10; G06K 19/06; G09F 3/16; B41F 13/54
[52] U.S. Cl. .......................... 235/462; 270/1; 40/2 R; 283/41; 40/23 A
[58] Field of Search .......... 235/61.12 N, 61.12 M, 235/61.12 R, 61.11 E, 61.11 D, 489, 491, 493, 462, 465, 494; 283/18, 22, 41; 40/2 R, 23 A; 340/146.3 C, 146.3 D; 209/DIG. 1; 360/2, 91, 92, 98; 178/6.8; 214/16.4 A; 270/1, 58

[56] References Cited

U.S. PATENT DOCUMENTS

| | | | |
|---|---|---|---|
| 3,001,306 | 9/1961 | Wilkinson | 40/2 R |
| 3,504,907 | 4/1970 | Barber et al. | 270/1 |
| 3,567,909 | 3/1971 | Allen | 235/61.11 E |
| 3,614,396 | 10/1971 | Goldstern | 235/489 |
| 3,652,830 | 3/1972 | Kessler | 235/491 |
| 3,652,830 | 3/1972 | Kessler | 235/61.12 N |
| 3,691,662 | 9/1972 | Cunningham | 40/23 A |
| 3,760,161 | 9/1973 | Lohne | 235/61.12 R |
| 3,774,758 | 11/1973 | Sternberg | 235/61.12 R |
| 3,854,605 | 12/1974 | Proper | 360/92 |
| 3,881,053 | 4/1975 | Lemelson | 178/6.8 |
| 3,924,744 | 12/1975 | Heimann | 40/2 R |
| 3,937,493 | 2/1976 | Fasbender | 283/41 |
| 3,946,507 | 3/1976 | Fergg | 40/2 R |
| 3,949,363 | 4/1976 | Holm | 340/146.3 C |
| 3,958,102 | 5/1976 | Burt | 214/16.4 A |
| 4,050,719 | 9/1977 | Cunningham | 40/23 A |

FOREIGN PATENT DOCUMENTS

| | | | |
|---|---|---|---|
| 925764 | 5/1973 | Canada. | |
| 2018504 | 12/1971 | Fed. Rep. of Germany | 235/489 |
| 2181409 | 11/1973 | France. | |

Primary Examiner—Robert M. Kilgore

[57] ABSTRACT

The specification describes a label used for the codification of various articles such as files, tapes, cassettes, and the like. The labels are color-coded and each label bears to one side of its colored field a machine readable marking with a pair of visual readable indicium in the colored field. Each label is identifiable by color, by its machine readable marking, and by its visual indicium. When working with labels as described above, there is no need to provide additional labels to complete the code. The code on each article in the system is a unique one, so that each article is readily discernable from all other articles in the system by both visual and machine inspection.

4 Claims, 9 Drawing Figures

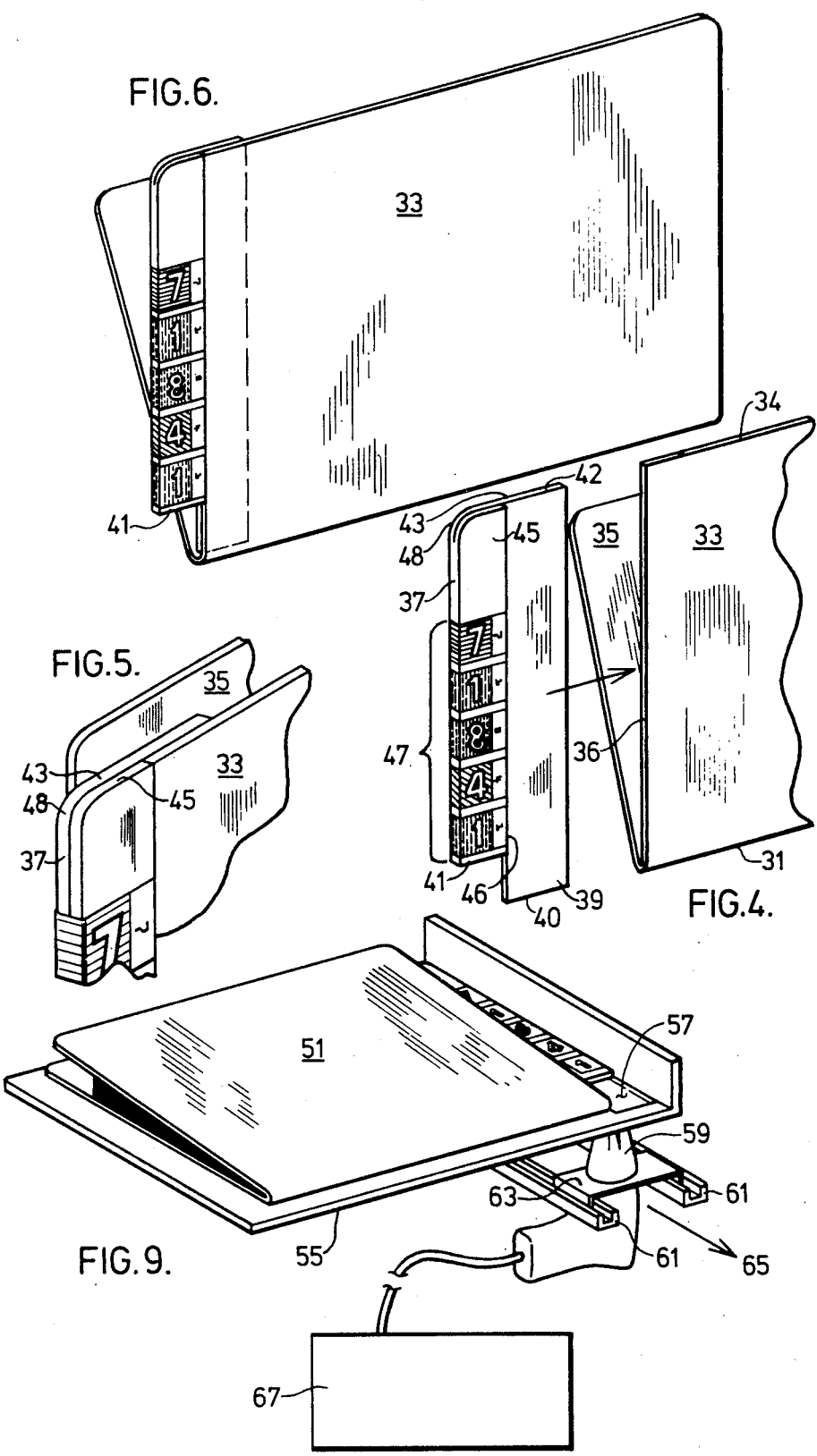

CODED LABEL

FIELD OF THE INVENTION

This invention relates to systems in which objects, such as files and the like, are provided with machine readable codes and a method of coding same through the use of individual labels having machine readable markings.

BACKGROUND OF THE INVENTION

In systems such as file systems involving hundreds, thousands and even hundreds of thousands of individual files, it is usually difficult to locate, to keep track of, and to correctly enter or return a file in the file system. It is normal office management procedure with large file systems to appoint a person or persons to maintain the system. The person in charge looks after the pulling of files from the system, manually recording the file whereabouts while it is out of the system, and returning or refiling the files as they are received. That same person must also make corresponding manual entries in records to indicate the return of a file. As can be appreciated, these steps of maintaining a large system of files, indexes, etc. can become very tedious and timeconsuming tasks. The maintenance of such systems can become even more complicated if for some reason or another there is a misfile in the system.

To overcome these problems this invention contemplates providing a system in which each article of the system has a code consisting of a unique visually recognizable colour coded arrangement or combination of individual labels. Each such label has a machine readable marking peculiar to that label to facilitate machine reading of the code. Misfiles in this system are prominent due to a disruption in what would otherwise be a consistent pattern of colours along the edges of the coded articles in a system.

BRIEF SUMMARY OF THE INVENTION

The system according to this invention is one in which each coded article has an arrangement or combination of a plurality of individual colour coded labels. A specific example would be that of a file system in which such arrangement is peculiar to each file in order to distinguish each file from all other files in the system. The labels may be affixed adjacent to one another along a file edge to provide a unique code for each file where each label having its own specific designation contributes in part to the code of the respective file in the system. To enable machine reading of each file code, each label bears on its coloured side a machine readable marking and at least one indicium which corresponds with the machine readable marking and the label colour or colours. The size of each indicium is such that it is visually recognizable by the person working with the file system. Each of the labels is therefore identifiable by colour, by its co-related machine readable marking and its indicium.

The individual labels are affixed to a part of the file so that the addition of each label to the file contributes in building up the file code because each label with its specific designation contributes in part to the code of the particular file. The orientation of the machine readable marking of each label is the same as that of an adjacent label and is consistent from file to file in the filing system. Therefore, the affixing of labels to each file is done in a manner so that all machine readable markings on any one file are located along a generally linear path on the same side of a file panel or file portion for reading by an electronic scanning device.

As the labels are affixed to each file, it can be appreciated that the machine readable markings are forming the file code so that when all labels have been applied, the machine readable aspect of the code is simultaneously completed. As a result, with this system there is no need to prepare a separate label on which machine readable markings would in their entirety on a single label designate the file code.

Due to the different combination of labels on each file in this system, every file has a unique code and is thereby readily discernable from all other files in the system by both visual and machine inspection.

The system according to this invention may also be used in the codification of articles in an ordered system. For example, computer tapes, cassettes and the like, may be stored according to a code. The labels of this invention may therefore be applied individually to each article so that a particular label arrangement designates the code of the article. The article can then be identified electronically by its machine readable markings.

The individual labels of the invention provide for a simultaneous formation of the visually recognizable and corresponding machine readable code of the file. It is therefore apparent that a great flexibility in coding or re-coding of files or articles in an ordered system is offered by the labels of this invention.

BRIEF DISCUSSION OF THE DRAWINGS

The aforementioned and other objects, advantages and features of the present invention will become apparent in the following detailed description of the preferred embodiments according to this invention. The concepts shown in the drawings are applicable to various types of systems in which objects are coded; however, the figures specifically show the concept of the invention as used in a file system, wherein FIG. 1 is a front view of a label according to this invention prior to application to a file;

FIG. 4 is a back elevational view of a file in use and a novel add-on tab for coding that file according to this invention;

FIG. 5 is an enlarged end view of the top portion of the add-on tab of FIG. 4 when affixed to a file;

FIG. 6 is a back elevational view of a file provided with the add-on tab of FIGS. 4 and 5;

FIG. 9, appearing on the same page of drawings as FIGS. 4 through 6, is a perspective view looking down on a file coded by means of a plurality of machine readable labels located on a machine for reading those labels.

DETAILED DESCRIPTION OF THE PREFERRED EMBODIMENTS

Figure 1:
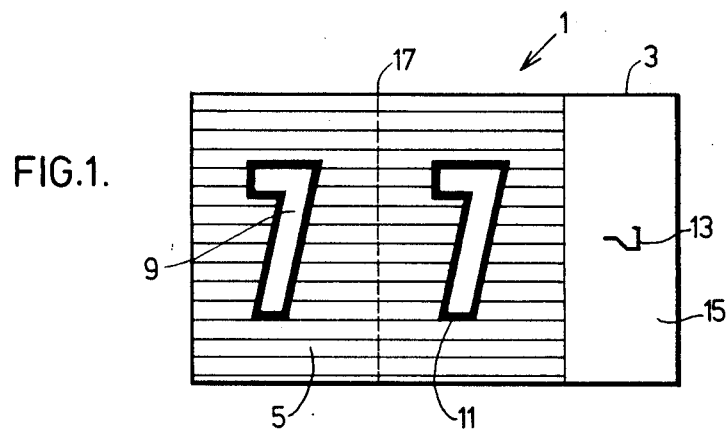

Referring to FIG. 1, the label according to this invention and as generally indicated at 1, consists of a base sheet 3 on which are provided a pair of identical spaced indicia in the form of visual numerals 7 referred to by reference numeral 9, and a machine readable marking which in this case is an OCR marking indicated at 13.

Base material 3 is generally a white sheet of paper which is coloured on one side as indicated by hatch lines 5 which cover a substantial portion of the label surface. It should be noted in FIG. 1 that OCR marking 13 appears on a non-coloured portion of the label surface. Preferably the coloured surface is provided with a wear-resistant coating which is clear and protects the surface of the label. The coating can be applied as the label is printed or later as a laminate such as Mylar (trade mark).

The visual numerals are formed by providing an outline 11 on the label surface. The area within the outline is not coloured, so that the white background of the base appears within the outline. There are, of course, various other methods of forming the visual numerals on the label.

Figure 3:
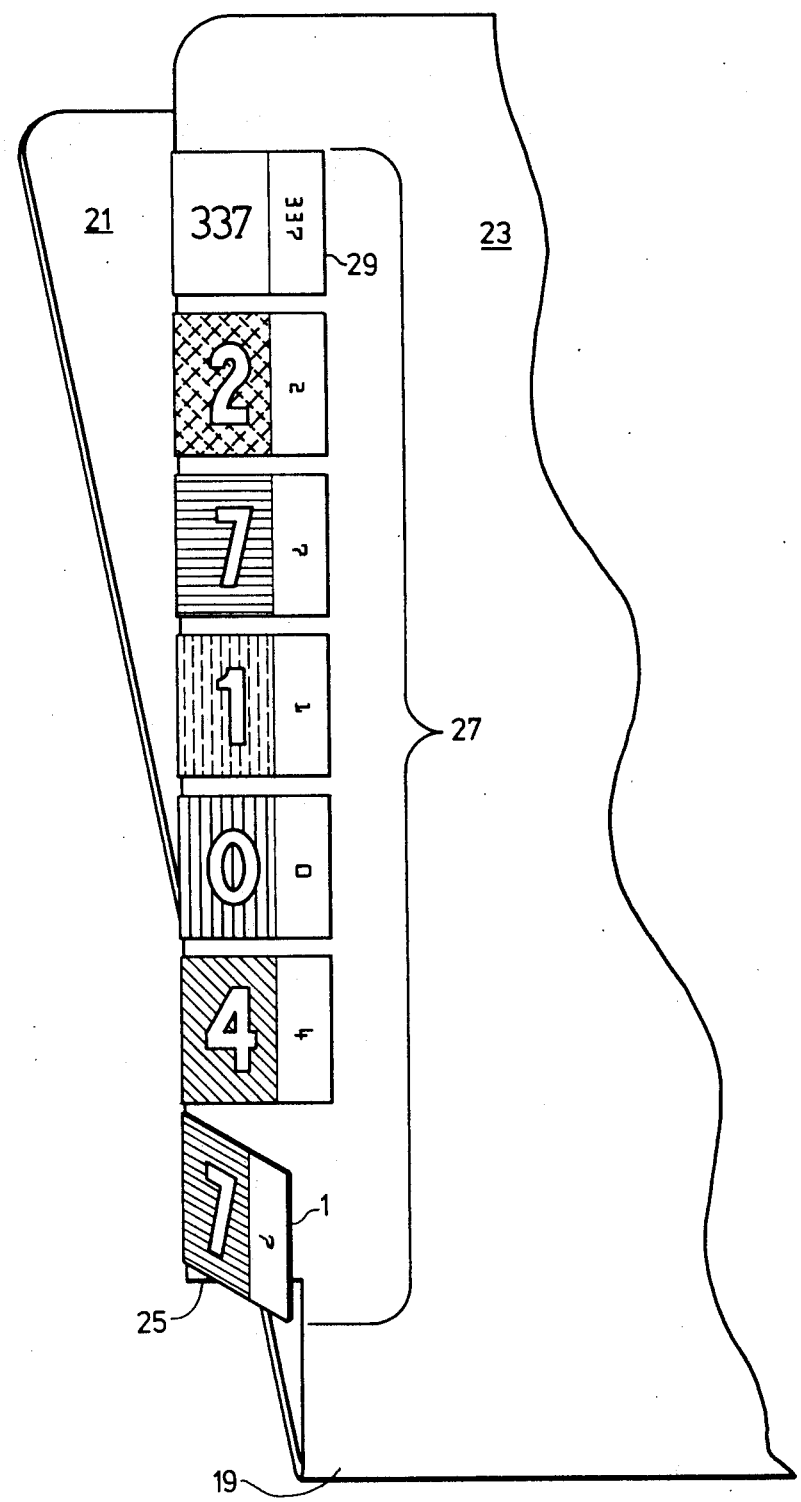
FIG. 3 is a back elevational view of the file of FIG. 2 on which the bottom label of the label arrangement is being affixed to the panel edge.

The label shown in FIG. 1 is somewhat larger than that contemplated for use on a conventional file. However, the portion of the labels appearing in FIG. 3 is approximately to scale of a preferred embodiment of the label. According to that preferred embodiment, the overall height of each label is approximately 15/16 of an inch. It is roughly 1⅜ inches in length and divided into sections of ⅜ of an inch, ⅜ of an inch, and ⅜ of an inch. Each of the visual indicium appears on a coloured ⅜" section of the label, and the OCR marking appears on the ⅜" non-coloured portion of the label. Reference numeral 17 indicates the fold line where the label is folded when affixed to the edge of a file or the like.

Again in practice, the height of each visual indicium is approximately 9/16 of an inch. The minimum width of the stroke of each indicium is roughly ⅛ of an inch, so that each indicium is of a size which makes it readily recognizable by the person attending to the file system.

The optical character recognition marking, which will be hereinafter referred to as OCR marking, is selected from a system identified as OCR-A (basic). Other systems, such as OCR-A (NRMA), OCR-A (international), or OCR-B (subset-1), could also be used. The OCR markings are machine printed in a manner to comply with existing technology, so that they are readable by an appropriate machine. Each marking is made by a single stroke of ink or other suitable marking material. The overall height of an individual OCR marking is approximately 0.108 inches, which includes a stroke width of 0.007 inches. Each marking is approximately 0.069 inches wide, which again takes into consideration the width of the stroke used to make the marking. Since the non-coloured area on which the markings are printed is 15/16 of an inch by ⅜ of an inch, there is substantial clearance on all sides of the marking.

It should be noted from FIGS. 1 and 3 that when the label is applied to an article and folded at line 17 there is no distortion to either the OCR marking or the visual indicium. For example, when applied to a file the label is folded about fold line 17 such that OCR marking 13 and the adjacent visual indicium appear on back side of the file panel, while the other visual indicium appears on the other side of the file panel. If the label were applied to an article such as a tape cassette, it would be folded at right angles such that the OCR marking and adjacent indicium appear on the back of the cassette, and the other indicium appears on the end of the cassette.

According to the label shown in FIG. 1, OCR marking 13 is oriented at right angles with respect to the visual numerals indicated at 9, and the two visual numerals are orientated consistently with respect to one another.

One of the prime objects of the present invention is to provide a label which is identifiable by its visual indicium, by its colour and by its machine readable marking. Therefore, the label in FIG. 1 is provided with visual numerals 7 and an OCR marking which is representative of the number 7. The label is dark blue in colour, and its colour is also representative of the number 7. Therefore, all labels in a particular system representative of the number 7 would be constructed in the same manner as that shown in FIG. 1.

The same filing system would include other labels which are coloured in a different manner and which bear different visual numerals and OCR markings (which have not been shown). These other labels would also be identifiable by their particular colours, by their visual numerals, and by their OCR markings. A representative selection of colours and visual numerals is shown in the following list:

| Colour | Visual Numberal |
| --- | --- |
| Light red | 0 |
| Dark red | 1 |
| Light orange | 2 |
| Dark orange | 3 |
| Light green | 4 |
| Dark green | 5 |
| Light blue | 6 |
| Dark blue | 7 |
| Mauve | 8 |
| Brown | 9 |

Each of the above labels would also include an OCR marking representative of its respective numeral and colour. The above-described colours, visual numerals and OCR markings for each label would be consistent throughout a particular coded system. They could, of course, be varied from system to system. Furthermore, each label could have a combination of colours for other designations as opposed to the singular colours given above.

Figure 8:
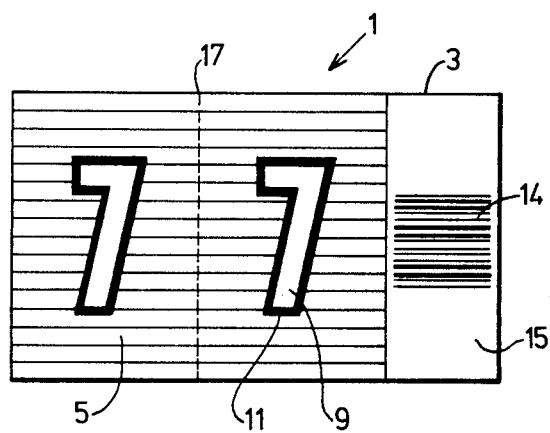
FIG. 8 shows an alternative embodiment of a label according to this invention.

According to other forms of the label, visual numerals 9 are replaced by visual letters or any other visual indicia readily recognizable to the person working with the system. Furthermore, the machine readable markings need not be OCR. They can include any type of machine readable marking, such as MICR (magnetic ink character recognition) or bar code, which fulfill the same function as the OCR marking. FIG. 8 shows a label similar to that of FIG. 1, with the exception that OCR marking 13 is replaced by a bar code 14. In this example, the bar code marking has been selected from a code known in the industry as Code 39. Other bar codes would of course be equally applicable to the present invention. Bar code marking 14 is representative of the number 7. Other numbers as well as letters would of course be represented by different markings. The exact representation of each marking is determined according to the arrangement of narrow and wide bars as well as the spaces therebetween.

Figure 2:
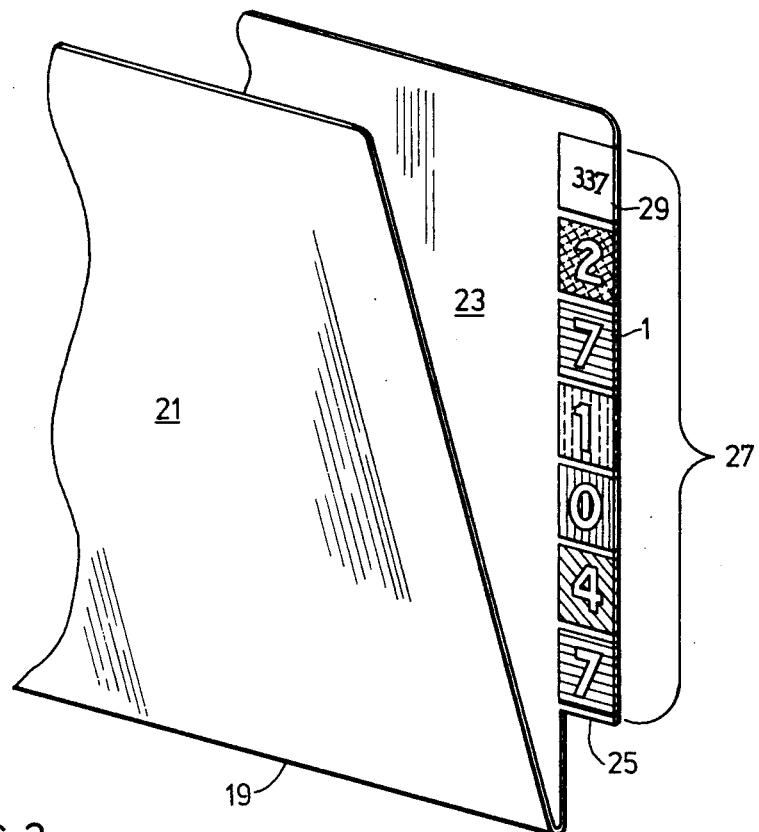
FIG. 2 is a front elevational view of a file bearing a plurality of labels along a panel edge.

FIGS. 2 and 3 show a file 19 provided with a code 27 comprising a plurality of colour-coded labels, as well as a non-colour-coded or black and white label 29. Each colour-coded label with its singular designation contributes in part to code 27, which is peculiar to file 19. The file includes a front panel 21 as well as a back panel 23. Back panel 23 is provided with an extended edge 25 to which the labels forming code 27 are affixed. Since all of the labels of the code which have distinct designations are different in colour from one another, the file has a multicoloured extending edge. Every other file in the file system will also have a multicoloured extended edge. However, the colour pattern or combination of colours differs from file to file, so that each and every file is discernable from all other files in the system.

Label 29 is provided with three visual numerals as well as three OCR markings representative of those numerals. A label such as label 29 is required in cases where it is not possible to provide the entire code along the extended edge of the file by means of colour-coded labels because of the number of letters or numbers in the file code.

As seen in FIG. 3, all of the OCR markings on the labels are positioned along a generally linear path on the same side of the panel to which the labels are affixed, so that all the OCR markings can easily be scanned by a scanning device.

One of the prime features of the present invention lies in the fact that each colour-coded label includes all three elements required to fully identify that label. Therefore, when coding a file such as file 19, the entire code of the file is changed by simply adding, deleting or substituting one of the labels. Furthermore, in an arrangement such as that shown in FIG. 3 in which label 1 is being affixed as the last label in the code, there is no need to provide any additional information on the file to identify the code. As can be seen from the figure, code 27 is completed by the addition of label 1. If this were not the case, then it would be necessary to add an additional label which included information about all of the previously applied labels. For example, if each of the individual labels in code 27 did not include their own optical character recognition markings, then it would be necessary to first apply the colour-coded labels and to thereafter apply a separate label provided with nine optical character recognition markings. This separate label could of course not be made up until the entire code of the file is determined. Furthermore, it might not even be possible to provide nine OCR markings on one label. However, according to the present invention, this does not present a difficulty because the markings are spaced from label to label. In addition, in a system in which each label is not fully identified, if it is desired to change the code of a particular file, it is first necessary to add or change one of the colour-coded labels, then remove the previously applied machine readable label, and thereafter apply a new machine readable marking. According to the present invention, the only step required in changing the code on the file is, as mentioned above, that of replacing, deleting or adding one label.

The above comments apply to all colour-coded labels contemplated by the present invention. For instance, the labels of code 27 could easily be replaced by a plurality of labels bearing other types of machine readable markings, such as the bar coded label of FIG. 8. Again, each label is fully identified and bears on its coloured side both visual indicia and a machine readable marking.

It will be noted that the labels of both FIGS. 1 and 8 are provided with machine readable markings which are orientated at right angles with respect to the visual numerals. Each of these labels is designed for application along the side as opposed to the top of a file panel.

The OCR marking could, of course, be rotated through 90° such that its orientation is the same as that of the visual indicia. However, in shelf filing systems where colour coding can be used to the greatest advantage, the files are placed on shelves with the code of the file extending outwardly from the side of the file. As will be apparent from the drawings, when the visual numerals are orientated such that they are upright with respect to the width of the labels, they are easily and quickly read when affixed to a file having a side code, while the OCR markings, which are upright with respect to the length of the label, are located for scanning by conventional scanning equipment.

The coding of files as described above is primarily for use in file systems which are to be put into use. It is also desirable to code files already in use and as can be appreciated it is very inconvenient and costly to replace the entire file folder. This difficulty is overcome through the use of the method shown in FIGS. 5 through 7 in which a plurality of labels are affixed to a backing to build up a code on the backing which is subsequently secured to a file. The code is built up in accordance with a predetermined sequence.

Referring to FIG. 4, a file 31 which is to be coded by means of an add-on tab 37 includes panels 33 and 35. Add-on tab 37 includes a first portion 39 and a second portion 41. The first portion is for use in securing the add-on tab to back panel 33.

A plurality of labels according to this invention are affixed in a predetermined sequence on second portion 41 of tab 37 to provide a readily recognizable visual and machine readable code 47. When add-on tab 37 is secured in place, file 31 has a multicoloured extended edge, as shown in FIG. 6.

The construction of add-on tab 37 ensures the proper positioning of the tab when secured to file 31. As can be seen in FIG. 4, the length of first portion 39 is essentially equal to the height of panel 33. Therefore, when the lower end 40 of first portion 39 is fitted against the bottom of file 31 on the inside of panel 33, the upper end 42 of the tab will be flush with edge 34 of panel 33. Referring to FIGS. 4 and 5, second portion 41 includes a base section 43 which lies on the same plane as first portion 39, as well as an embossed section 45, so that there is a slight shelf 46 between portions 39 and 41. Shelf 40 is fitted against edge 36 of panel 33 when applying the add-on tab to the file. It will also be noted from FIGS. 4 through 6 that the edges of the labels of code 47 are aligned with shelf 46 to ensure that the OCR markings of the labels lie along a generally linear path. Second portion 41 is provided with a rounded corner 48 so that the shape of the extended edge is consistent with that of panel 35. The add-on tab is held in place by any suitable adhesive, which is applied directly to first portion 39 of tab 37, or alternately this portion may have a pressure-sensitive adhesive with a protective peel strip.

Figure 7:
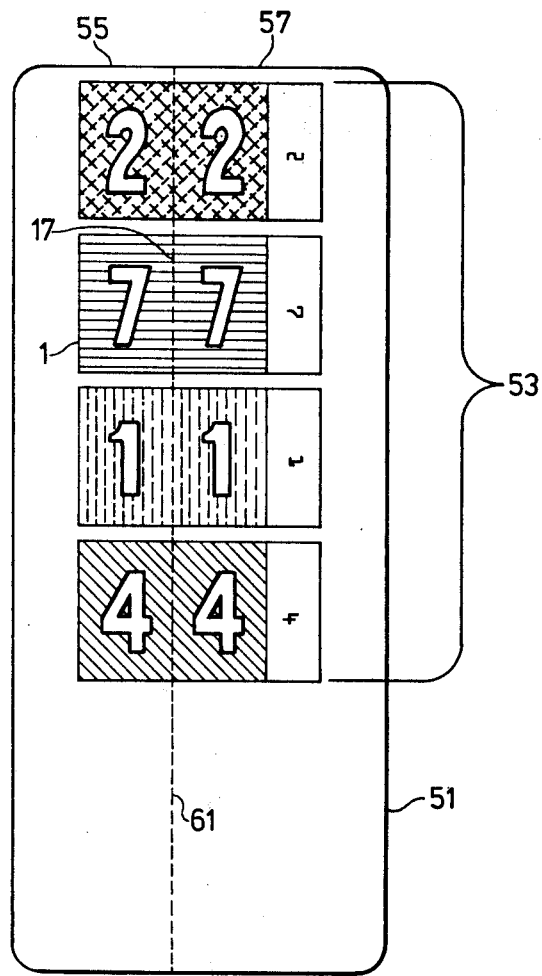
FIG. 7 shows a second type of add-on tab according to this invention.

FIG. 7 shows a somewhat different type of add-on tab suited for use on non-standard files such as expansive type files or large X-ray folder files. Tab 51 again includes a code 53 comprising a plurality of individual labels according to this invention. Once code 53 has been properly built up, tab 51 is secured to a file (not shown).

Tab 51 is secured to a file panel in much the same manner as is an individual label. Tab 51 includes a first portion 55 and a second portion 57. The tab is provided with a fold line 61. The labels of code 53, as exemplified by label 1, are layed out flat on the add-on tab with their respective fold lines 17 aligned with fold line 61 of tab 51. When the tab is ready to be secured to a file, it is folded about the file panel edge and secured there by means of any suitable adhesive. Foldline 61 is coincident with the panel edge, thereby ensuring that the indicia of the labels located on first section 55 are positioned in a non-distorted manner on the inner surface of the file panel, while the indicia and OCR markings appearing on second section 57 lie flat on the outer surface of the file panel. The add-on tab of FIG. 7 is secured to the extending edge of a file such as that shown in FIG. 2.

FIG. 9 schematically shows a setup which may be used to facilitate machine reading of an article coded by means of labels according to this invention. The figure specifically shows the machine reading of a coded file, but it is again to be understood that the file could be replaced by any coded article such as a tape cassette or the like. The code is applied to the file by means of individual labels having any type of machine readable marking or as an add-on tab, as described above.

File 51 is positioned by jig 55 which locates the code of the file with the machine readable markings directly above window 57 provided in the jig. Located directly below window 57 is a scanning device in the form of OCR wand 59. The wand is slidably secured in a pair of tracks 61 by a U-shaped bracket 63. Wand 59, which moves in the direction of arrow 65, is shown in FIG. 9 after having completed a scan. The movement of the wand can be actuated manually or automatically by the jig after positioning of the file. The wand scans the machine markings on the labels through window 57. In some instances additional markings may be required to initiate and/or stop the wand reading a file code. Such additional markings can be provided on a transparency which is positioned in the window beneath the file to provide the required additional wand instruction at either or both ends of the file code.

When working with OCR markings, it is important that the scanner see the entire marking on each label so that the OCR markings should lie along a generally linear path. The scanner is of course able to accommodate a slight deviation because its field of scan is larger than the individual markings.

Since each of the OCR markings are orientated such that they are upright with respect to the length of the label, and since they are located on the outer surface of the rear panel of the file, the scanning device scans the markings along a horizontal plane, as opposed to a vertical plane, in accordance with existing scanning technology.

In a situation where the individual labels are provided with OCR markings, scanning device operates by editing the data represented by the machine-printed OCR markings of the file code, converting that data to electronic signals used to identify the markings, and transmitting such signals to computer memory storage 67. The OCR markings are translated to electronic signals by illuminating the markings, focusing the reflected light energy on a photosensor array, and assessing the electrical output of the array for subsequent processing. The whereabouts of the file is also located in computer 67 so that anyone searching for that particular file simply checks with the computer to determine its location.

Other types of machine readable markings are scanned in somewhat different manners. For instance, as earlier mentioned, if the labels are coded by means of bar coding, the scanner reads in accordance with the dimensions, i.e. the width of the bars and spaces in the code. Each of the markings on the individual labels includes its own start and stop sequence to let the scanner know when it has started and when it has completed the scan of a particular individual marking.

According to this invention, there are three ways of identifying each and every article in a coded system. The articles can be identified by the arrangement of colours in their codes, by the visual indicia of their codes, and by the OCR markings of their codes. The colour identification is especially helpful when working with a file system in locating a misfile, because that misfile will break the otherwise consistent pattern of colours inherent in a correctly filed system. Reference to a specific file is especially easy, fast and direct, because the colour blocks are located at the extreme edge of the file and can therefore be distinguished without requiring substantial, if any, fanning of the files. The colours that identify the various labels are easily memorized and read as the label that they represent. The identification of the visual numerals is self-apparent, and the reading of the machine readable markings has been described above.

The drawings show files on which all or substantially all of the code is colour-coded. However, it is not always necessary to colour code all of the labels in the code, although the speed of reference is greatly increased when five or six of the labels are colour identifiable. It is on the other hand possible to colour identify only two or three of the labels, in which case the files are necessarily grouped into blocks of numbers. With this arrangement, one can easily find the desired colour block, and reference to a particular file within that colour block may require some fanning to locate the file. As mentioned above, no fanning is required when all of the labels are colour identified.

The number of labels within a code that should be coloured depends on the number of digits in the reference number and the total number of files in the system. For example, a typical reference number or code in the casualty insurance business would be 7367060. In this case the last five digits, 67060, should be colour identified. The prefix 73 is printed in black on a white label without colour identification, as exemplifed by the embodiment shown in FIGS. 2 and 3.

From the foregoing it will be apparent that the present invention contemplates systems in which coded articles can be quickly identified and in which improperly filed articles are easily located. When the article is to be removed from the system, its whereabouts is recorded by a machine capable of reading the code on the article. Location of the article is stored in a computer so that anyone searching for the article after it has been removed from the system can easily determine its whereabouts. Virtually no manual operation is required in recording the location of the article. When the article is returned to the system the stored information is erased from the computer. Therefore the method of filing and locating articles is one which is simple and easy while at the same time being thorough and efficient.

Although various preferred embodiments of this invention have been described herein in detail, it will be apparent to those skilled in the art that variations may be made thereto without departing from the spirit of the invention or the scope of the appended claims.

The emodiments of the invention in which an exclusive property or privilege is claimed are defined as follows:

1. A file at least partially coded by means of a plurality of colour coded labels wrapped around a side edge of a file panel and affixed to both sides of a file panel, each of said labels having a colour field, two spaced-apart indicium located in and visually recognizable in said colour field, said label being folded about fold line extending along the portion of said colour field located between said spaced-apart indicium, machine readable bar code off to one side of said colour field and oriented to be machine read in a direction parallel to said fold line, said bar code for each label including start-stop codes to permit individual reading of each label, said indicium being of sufficient size to facilitate visual recognition, said bar code corresponding to the singular designation of such colour and indicium, each of said labels being identifiable by colour, by its bar code and by its indicium; the colour, bar code and indicium of each label having its singular designation contributing in part to the code of said file, the orientation and relative positions of the indicium and bar code on each label being the same as that on an adjacent label, each of said labels being folded about said panel side edge along said label fold line with the portion of the colour field between said indicium presented along and adjacent such side edge and with said bar code located on the back of said panel, all of which are in generally linear path by virtue of positioning each label fold line along such side edge to permit reading of all bar codes on said labels on file folder panel back in a linear pass by a scanning device.

2. A file as claimed in claim 1 wherein said two indicia are a pair of identical numerals.

3. A file as claimed in claim 1 wherein said two indicia are a pair of identical letters.

4. A file as claimed in claim 1 wherein said coloured side is provided with a wear resistant coating.

* * * * *